United States Patent [19]
Durbin

[11] Patent Number: 5,488,788
[45] Date of Patent: Feb. 6, 1996

[54] GROUNDWORKING ATTACHMENTS FOR AN OUTRIGGER STABILIZER PAD

[76] Inventor: Ricky L. Durbin, 164 W. Bond, Bement, Ill. 61813

[21] Appl. No.: 224,283

[22] Filed: Apr. 7, 1994

[51] Int. Cl.⁶ .............................. B60S 9/00; B66C 23/78
[52] U.S. Cl. ........................... 37/443; 172/792; 172/795; 172/818; 172/824; 212/301; 280/763.1; 280/764.1; 280/766.1
[58] Field of Search ............................ 37/104, 105, 443; 172/792, 795, 796, 797, 818, 819, 820, 821, 822, 823, 824, 825; 212/189, 301; 280/763.1, 764.1, 765.1, 766.1

[56] References Cited

U.S. PATENT DOCUMENTS

| | | | |
|---|---|---|---|
| 740,430 | 10/1903 | Heusner et al. | 172/797 |
| 1,272,110 | 7/1918 | Robinson | 212/189 X |
| 1,793,066 | 2/1931 | Dean | 172/795 |
| 1,813,071 | 7/1931 | Moritz | 172/795 |
| 2,601,380 | 6/1952 | Flory | 97/137 |
| 2,629,946 | 3/1953 | Ewers et al. | 172/818 X |
| 2,718,312 | 9/1955 | Pilch | 212/66 |
| 2,749,630 | 6/1956 | Nave | 172/821 |
| 2,764,306 | 9/1956 | Dorkins | 212/189 X |
| 2,983,482 | 5/1961 | Cary | 254/132 |
| 3,669,285 | 6/1972 | Neff | 214/138 C |
| 3,913,942 | 10/1975 | MacKenzie et al. | 280/764.1 |
| 4,023,828 | 5/1977 | MacKenzie et al. | 280/763 |
| 4,026,428 | 5/1977 | Shumaker | 212/189 X |
| 4,039,206 | 8/1977 | Nault | 280/763 |
| 4,286,803 | 9/1981 | Schulz | 212/189 X |
| 4,295,661 | 10/1981 | Maurer | 280/765.1 |
| 4,360,074 | 11/1982 | Parquet | 280/766.1 X |
| 4,461,491 | 7/1984 | Eklund | 280/763.1 |
| 4,473,239 | 9/1984 | Smart | 280/763.1 |
| 4,579,178 | 4/1986 | Dover | 172/297 |
| 4,798,011 | 1/1989 | Sprinkle | 37/108 R |
| 4,837,940 | 6/1989 | Mahan | 172/797 X |
| 4,848,012 | 7/1989 | Zimmerman | 37/117.5 |
| 4,848,483 | 7/1989 | Heiple | 172/821 |
| 4,953,625 | 9/1990 | Hurworth | 172/305 |
| 4,986,010 | 1/1991 | Cartner | 37/108 R |
| 5,137,301 | 8/1992 | Müller et al. | 280/766.1 |
| 5,241,763 | 9/1993 | Dynan | 37/407 |
| 5,310,217 | 5/1994 | Paskey et al. | 280/763.1 |

FOREIGN PATENT DOCUMENTS

| | | | |
|---|---|---|---|
| 963252 | 2/1975 | Canada | 172/817 |
| 643122 | 1/1979 | U.S.S.R. | 280/766.1 |
| 2102516 | 2/1983 | United Kingdom | 280/764 |

OTHER PUBLICATIONS

CASE Model 850 B Angle TiH Dozer Blade Jun. 1977.

*Primary Examiner*—Dave W. Arola
*Assistant Examiner*—Andrea Chop
*Attorney, Agent, or Firm*—Wood, Phillips, VanSanten, Clark & Mortimer

[57] ABSTRACT

Flexibility of operation is added to a vehicle (10) having a vehicle frame (12) with an operator area (18) and front and rear wheels (14), (16), a power tool (32), a pair of outrigger arms (48) pivoted to the frame (12) and hydraulic cylinders (62) extending between the frame (12) and the arms (48) by providing a ground engaging tool (70), (168), (172), (192) mounted on at least one of the arms (58).

15 Claims, 4 Drawing Sheets

GROUNDWORKING ATTACHMENTS FOR AN OUTRIGGER STABILIZER PAD

FIELD OF THE INVENTION

This invention relates to vehicles having outrigger stabilizer pads, and more particularly, to the provision of ground working attachments for such pads whereby the outrigger systems of such vehicles may be utilized for ground working purposes in addition to vehicle stabilization.

BACKGROUND OF THE INVENTION

Many wheeled and crawler type vehicles today are provided with stabilizing outriggers. In the usual case, the vehicles serve as a means of transport for some sort of tool such as a backhoe, a crane or hoist, a ladder or the like that is carried by the vehicle frame to be transported thereby to a place of use. When the vehicle has travelled to the location of use, the outrigger stabilizers are caused to engage the ground, typically on opposite sides of the vehicle and typically at locations outboard of the wheels or tracks of the vehicle so as to prevent tipping when the tool carried by the vehicle is operated and is under load.

Because the outrigger stabilizers are not used when the vehicle is in transit, it is customary to provide a means for retraction of the outrigger stabilizers. One common construction that includes provision for such stowage involves the use of elongated outrigger arms having inboard ends and outboard ends. The inboard ends are pivotally connected to the vehicle frame so that the arms may be rotated about a generally horizontal axis.

The outboard end of the arm is pivotally mounted to a stabilizing shoe which, in the usual case, has a substantially flat, ground engaging surface of substantial area. In many instances, this surface may be provided with cleats as is well known.

The assemblage is completed by a hydraulic cylinder for each arm. Typically, the hydraulic cylinder will have its rod end connected to the outrigger arm near, or at, its outboard end. Usually, a pivot pin is employed to connect the shoe to the outboard end of the outrigger arm and this pivot pin forms a convenient means for securing the rod end of the hydraulic cylinder to the outrigger arm as well.

The cylinder end of the hydraulic cylinder is then pivotally connected to the vehicle frame, usually at a location above the inboard end of the outrigger arm. As a consequence of this construction, retraction of the cylinder will pivot the arms inwardly toward the vehicle frame and lift the shoes out of engagement with the underlying terrain. That is to say, retraction of the cylinder results in the outrigger stabilizers being moved to a retracted position for vehicle travel.

Conversely, extension of the cylinders causes the arms to be lowered to engage the shoes with the underlying terrain.

Typically, the vehicle has some sort of operator location whereat an operator of the vehicle may be disposed in the presence of controls for the tools carried by the vehicle as well as for the hydraulic cylinders that operate the outrigger stabilizers. In many instances, this operator location will be the same location whereat the operator is disposed to operate the vehicle in transit.

In any event, because of the need for stabilization of the vehicle as well as the need to readily stow the outrigger stabilizers when the vehicle is in transit, hydraulic controls for the outrigger stabilizers are highly desirable. At the same time, because of the expense involved in providing the requisite hydraulic circuits and components, it would be highly desirable if the same hydraulic components and circuits could be utilized to perform useful functions other than vehicle stabilization as well as the vehicle stabilization function for which they were designed.

The present invention is directed to achieving that result.

SUMMARY OF THE INVENTION

It is the principal object of the invention to provide a means whereby hydraulically operated outrigger vehicle stabilization systems may not only be employed for the usual vehicle stabilization purposes, but may be additionally employed to mount tools, typically ground engaging tools, that may be used to perform other functions such as grading, scarifying, scraping, etc.

An exemplary embodiment of the invention achieves the foregoing object in a vehicle that includes a vehicle frame having sides and front and rear ends. Means are provided to define an operator location on the frame and front and rear wheels or crawler tracks are also located on the frame. A power tool is mounted on the frame between the rear wheels or crawler tracks and is operable from the operator location. A pair of outrigger arms having opposed ends are provided. One arm is disposed on each side of the frame near the rear end and has one end pivoted thereto for rotation about a generally horizontal axis. A hydraulic cylinder extends between the frame and each of the arms and is operable to move the arms about the horizontal axis.

According to the invention, a ground engaging tool selected from the group consisting of a moldboard, a box scraper, and a scarifier is mounted on the other end of at least one of the outrigger arms.

As a consequence, the vehicle may be placed in motion and the ground engaging tool carried by the outrigger arm controlled through use of the corresponding hydraulic cylinder to grade, scrape or scarify.

In one embodiment of the invention, the tool is mounted on the end of the arm via a ground engaging stabilizing shoe having a flat surface of substantial area.

In a preferred embodiment, the tool is adjustably mounted on the arm end.

In one embodiment of the invention, there is provided an adjustable connection between the tool and the arm end and includes a lock for the adjustable connection. In one embodiment, the lock is manually adjustable.

In one embodiment of the invention, the tool may be manually adjusted on the end of the arm while in another embodiment of the invention, provision may be made for power adjustment thereon.

According to another aspect of the invention, a back hoe is provided and includes a vehicle frame having sides and front and rear ends. An operator location and front and rear wheels are provided as before. A back hoe is mounted on the rear end of the vehicle frame and is operable from the operator location. A pair of outrigger arms are provided as before as are hydraulic cylinders.

Preferably, stabilizing shoes are pivotally connected to each of the arms at their ends remote from the frame and are adapted to firmly engage the underlying terrain outboard of the rear wheels to provide support for the frame against tipping. Mounting means are disposed on at least one of the stabilizing shoes whereby a ground engaging tool may be coupled to the one shoe, and thus the associated outrigger arm, to be powered by the hydraulic cylinder connected to the associated outrigger arm. The structure is completed by the provision of a ground engaging tool having mounting means complimentary to the mounting means on the one stabilizing shoe so that the ground engaging tool may be mounted on the one stabilizing shoe.

In a preferred embodiment of the invention, the tool is a moldboard.

In one aspect of the invention, the mounting means includes a movable connection whereby the relation of the tool coupled to the stabilizing shoe to the shoe may be adjusted. Adjustment may be accomplished either manually or by powered means.

In a preferred embodiment, the movable connection includes a pivot and further includes a stop means for disabling the pivot in any one of a variety of positions.

in one embodiment of the invention, the shoe has a generally flat ground engaging surface of substantial area and the pivot includes a bushing on the shoe having a shaft receiving opening generally transverse to the ground engaging surface.

When the invention is provided with the disabling means mentioned previously, it preferably comprises a series of apertures in one of the shoe and the tool and at least one aperture in the other of the shoe and the tool. The one aperture is selectively alignable with any one of the apertures in the series and a pin is provided which is sized to extend through aligned ones of the apertures, thereby preventing relative movement between the shoe and the tool.

According to one embodiment of the invention, the complimentary mounting means includes a shaft receivable in the bushing and the shaft mounts a bracket on one side thereof. Adjustable means secure the tool to the bracket so that the attitude of the shaft to the tool may be selectively changed.

According to this facet of the invention, the adjustable means comprises spaced, arcuate slots in the bracket and studs on the tool which are receivable in the slots together with means for locking the studs in a desired position within the slots.

Other objects and advantages will become apparent from the following specification taken in connection with the accompanying drawings.

DESCRIPTION OF THE PREFERRED EMBODIMENTS

Figure 1:
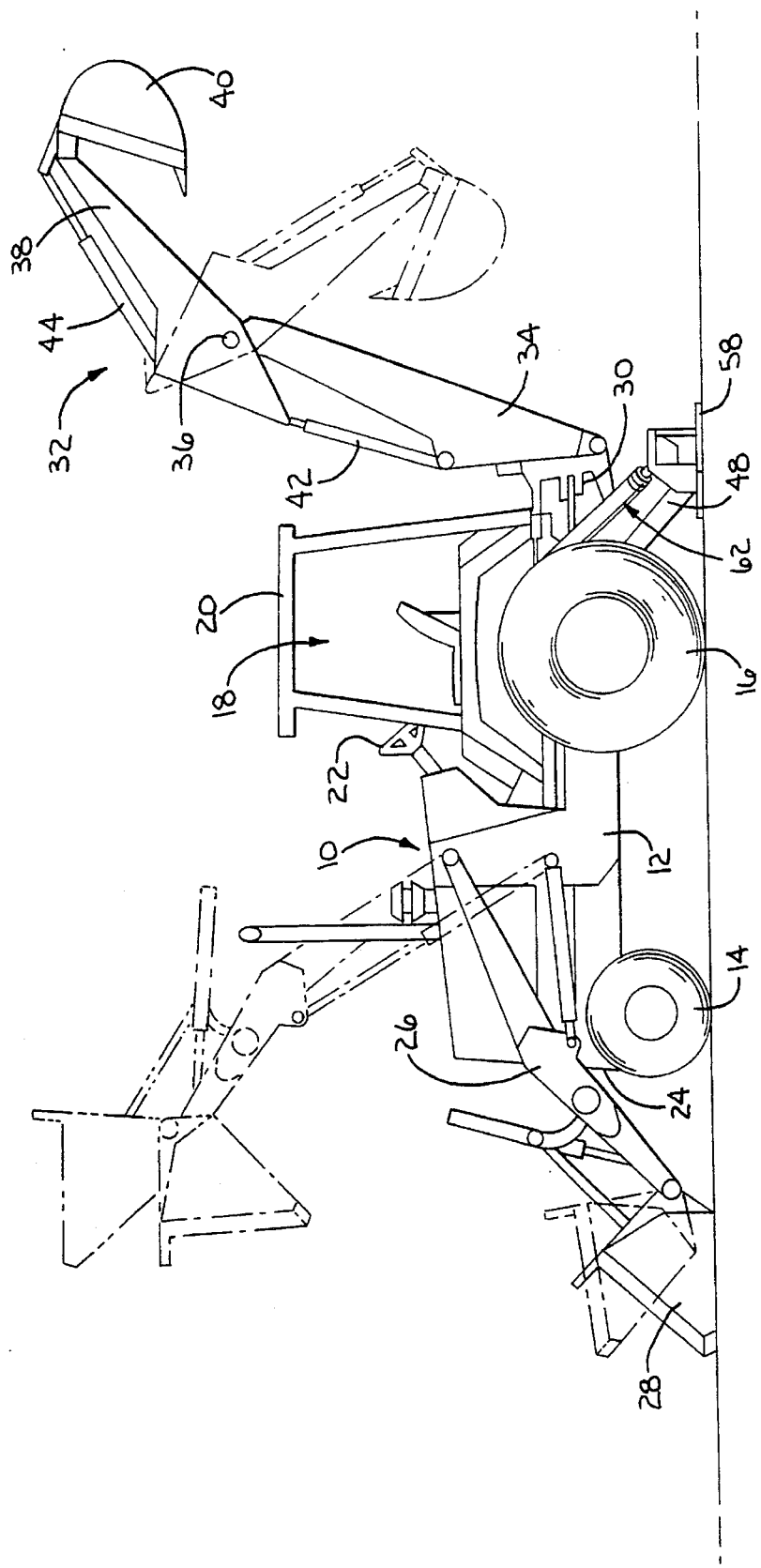
FIG. 1 is a side elevation of a vehicle with which the invention may be used.
Figure 2:
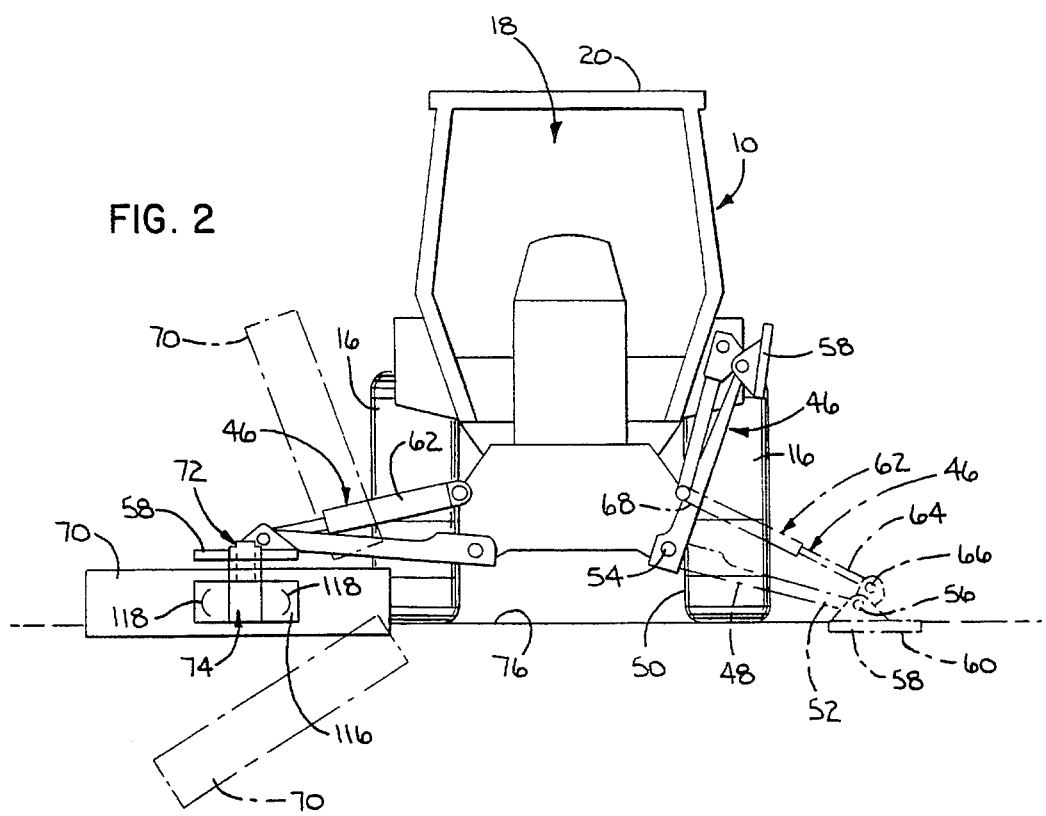
FIG. 2 is a rear elevation of the vehicle showing an attachment made according to the invention and placed thereon.

An exemplary embodiment of a vehicle with which the invention is advantageously intended to be employed is illustrated in FIGS. 1 and 2 and is typically of the type which is referred to as a "backhoe". However, it is to be understood that use of the invention is not limited to vehicles such as illustrated in FIGS. 1 and 2, but may be extended to other sorts of vehicles employing outrigger stabilizers as will be apparent to those skilled in the art.

The exemplary vehicle illustrated includes a tractor, generally designated 10, having a vehicle frame 12 mounting a pair of front wheels 14 (only one of which is shown) and a pair of rear wheels 16. The tractor 10 includes an operator area, generally designated 18, which is located within a conventional rollover protection structure 20. Vehicle controls as, for example, a steering wheel 22, and various throttle and hydraulic controls (not shown) for a backhoe are accessible at the operator area 18.

The tractor 10 includes a front end 24 and a pair of lift arms 26 thereat conventionally mount an end loader bucket 28. At the rear end 30 of the vehicle, a conventional backhoe, generally designated 32, is located. The backhoe 32 includes an inner boom 34 pivotally connected at 36 to an outer boom 38 which in turn pivotally mounts a bucket 40. A swing motor (not shown) provides for powered pivoting of the backhoe 32 about a generally vertical axis at the rear end 30 of the tractor 10. The hydraulic cylinder 42 controls the attitude of the outer boom 38 on the inner boom 34 while a hydraulic cylinder 44 controls the attitude of the bucket 90 on the outer boom 38. The backhoe 32 is conventionally operated by an operator facing rearwardly and located in the operator area 18 using the hydraulic controls generally referred to previously.

Because of the loading that is involved during operation of a backhoe 32, and the fact that because the same is pivotal about a vertical axis in relation to the vehicle frame 12 and thus can reach outside the envelope of the frame 12, the tractor 10, at a location just rearwardly of the rear wheels 16, is typically provided with outrigger stabilizers, generally designated 46. Conventionally, the stabilizers 46 are provided on both sides of the tractor 10 and as seen in FIG. 2, each stabilizer 46 is movable between a retracted, solid line position (see the right hand stabilizer 46) and a dotted line, ground engaging position.

Conventionally, each stabilizer includes an elongated stabilizer arm 48 having an inboard end 50 and an outboard end 52. The inboard end 50 is connected by a pivot pin 54 to the vehicle frame for rotation about a horizontal axis. The outboard end 52 is connected via a pivot pin 56, also disposed horizontally, to a ground engaging stabilizing shoe 58. The undersurface 60 of the shoe 58 is generally flat (although it may be provided with cleats) and is of considerable surface area to provide a large bearing surface.

A hydraulic cylinder, generally designated 62, is provided as part of each stabilizer 46. Its rod end 64 may be connected via a pivot pin 66, or, in some instances, the pivot pin 56, to the outboard end 52 of the arm 48 or to ears on the shoe 58 as desired.

The cylinder end 68 of the hydraulic cylinder 62 is pivotally connected as at 70 to the vehicle frame at a location above the inboard end 50 of the arm 48. By extending the cylinder 62, the shoes 58 may be moved to the dotted line position illustrated in FIG. 2 (also illustrated in solid lines in FIG. 1). Retraction of the cylinder 62 will result in the outrigger stabilizer 46 being moved to the solid line position shown on the right hand side of FIG. 2.

According to the invention, one or both of the outrigger stabilizers 46 may be provided with a ground engaging tool. In FIG. 2, the left side outrigger stabilizer 46 is provided with a ground engaging tool in the form of a moldboard 70. The shoe 58 is provided with a mounting means, generally designated 72, for the moldboard 70 while the latter carries a complimentary mounting means 74 whereby the moldboard 70 may be coupled to the shoe 58 for movement between dotted line positions shown in FIG. 2.

As a consequence of this construction, the hydraulic cylinder 62 for the left hand outrigger stabilizer 46 may be operated to control the attitude of the moldboard 70 with respect to the tractor 10 while the tractor 10 is traversing the underlying terrain 76. As will be seen, ground engaging tools other than the moldboard 70 may be employed. For example, a scarifier or a box scraper may also be used.

Figure 3:
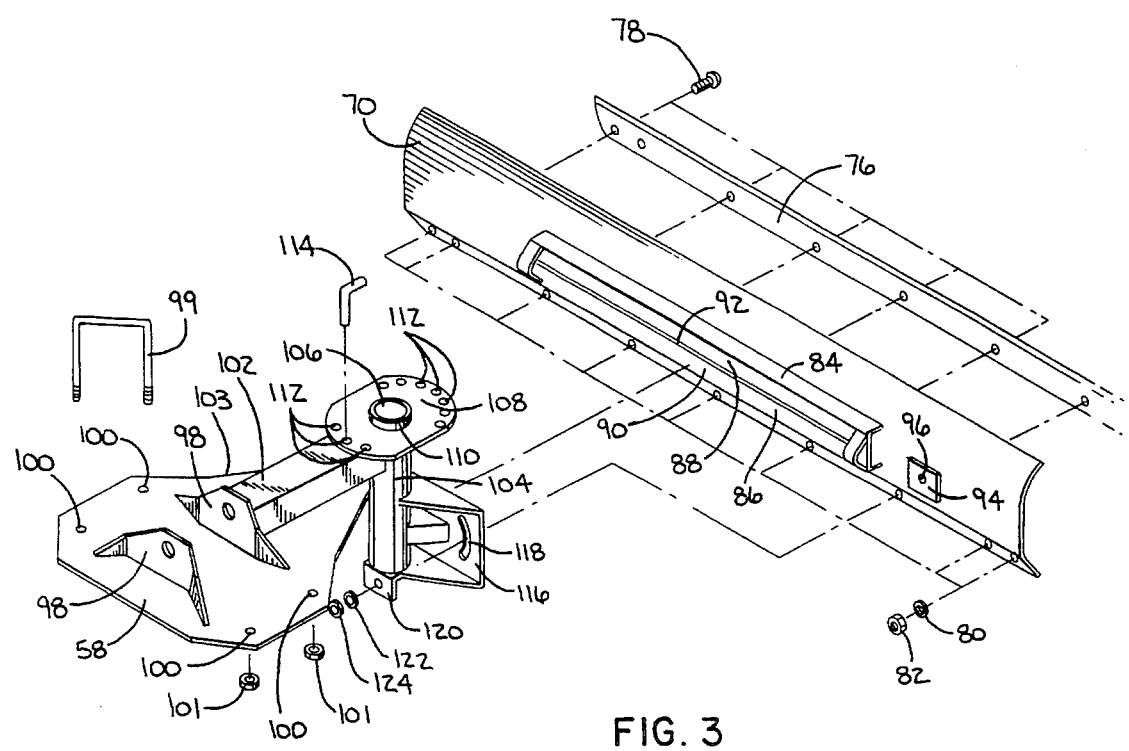
FIG. 3 is an exploded view illustrating one type of attachment that may be used according to the invention.

Referring now to FIG. 3, one form of the moldboard 70 will be described in greater detail. The same is provided with a scraper edge 77 which is secured to the lower edge of the moldboard 70 by bolts 78, lock washers 80 and nuts 82.

The rear surface of the moldboard 70 is provided with a pair of angle irons 84 and 86 which are elongated in the direction of the moldboard 70 and which have tongues 88 and 90 extending towards each other but which are separated by a small space 92.

A pair of small plates 94 (only one of which is shown) are sized so as to be receivable in the space between the angle irons 84, 86 and the back of the moldboard 70 and each mounts a threaded stud 96 whose diameter is just less than the width of the space 92 between the angle irons 84, 86. Consequently, the stud 96 may project out of the space 92 when the plates 94 are disposed between the angle irons 84, 86 and the moldboard 70.

The stabilizing shoe 58 may be of conventional construction and includes upwardly extending, apertured tongues 98 which receive the pivot pin 56. A U-bolt 99 may be fitted over the stabilizer arm 48 (not shown in FIG. 3) to be passed through apertures 100 in the shoe 58 and receive nuts 101 on the opposite side thereof. The U-bolt 99 thus serves as a removable clamp to prevent the shoe 58 from pivoting on the stabilizer arm 48. An extension 103 may be placed on one side of the shoe 58 and mounts a tube 102 of rectangular cross-section which extends generally away from the tongues 98.

The tube 102 mounts a vertically oriented bushing 104 which may journal a vertically oriented shaft 106. A plate 108 is coupled to the shaft 106, usually in a removable fashion by means of a collar 110 and a key (not shown). The plate 108 includes a series of apertures 112 that are located the same distance from the axis defined by the shaft 106. The tube 102 includes at least one aperture the same distance from the axis of the shaft 106 so that the same is thus alignable with anyone of the apertures 112. A lock pin 114 is adapted to be disposed through aligned apertures so as to lock the plate 108, and thus the shaft 106, in any given angular position relative to the tube 102, and thus to the shoe 58.

Rigidly fixed to the shaft 106, on one side thereof, is a bracket 116. As seen in FIGS. 2 and 3, the bracket 116 includes, on opposite sides of the shaft 106, arcuate slots 118 which are concave towards each other. The slots 118 are sized to receive the studs 96. The studs 96 may extend through the slots 118 and through an aperture tie plate 120 to receive a lock washer 122 and a nut 124. As a consequence, it will be appreciated that the moldboard is mounted to the bracket 116 for rotation about a generally horizontal axis so that the angle of the moldboard 70 in relation to the shoe 58 may be readily changed. At the same time, the bracket 116 is mounted for movement about a vertical axis defined by the shaft 106, allowing the position of the moldboard 70 to be adjusted with respect thereto, that is about a second axis 900 to the first. Consequently, by manual adjustment of the moldboard to the shoe 58 and the use of the cylinder 62 associated with the shoe, the moldboard 70 may assume a variety of attitudes with respect to the vehicle for plowing or grading purposes.

Figure 4:
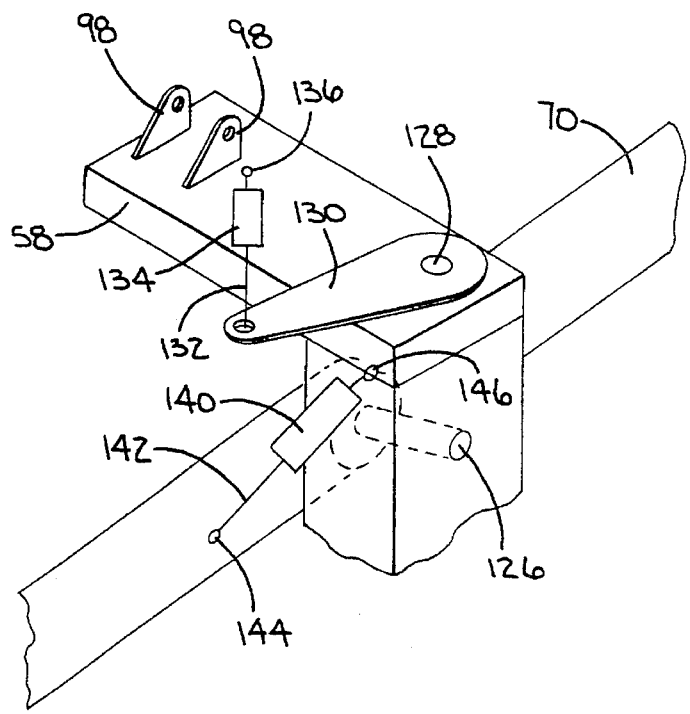
FIG. 4 is a somewhat schematic, perspective view of another form of attachment.

In some cases, it may be desirable to provide a greater degree of sophistication. In such a case, the embodiment illustrated in FIG. 4 may be employed. Here, the moldboard 70 is mounted by a trunion 126 for rotation about a horizontal axis. The trunion 146 is, in turn, mounted to the shoe 58 at an extension thereof for rotation about a vertical axis defined by a shaft 128.

A lever arm 130 is coupled to the shaft 128 and to the rod end 132 of a cylinder 134 which in turn is pivotally mounted at 136 to the shoe 58. As a consequence, through selective operation of the cylinder 134, one end or the other of the moldboard 70 may be advanced or retracted with respect to the other in the direction of travel of the vehicle.

A second cylinder 140 has its rod end 142 pivotally connected at 144 to the moldboard 70 and the cylinder 140 itself is pivotally connected as at 146 to the trunion 126. Through selective operation of the cylinder 140, the orientation of the moldboard 70 with respect to the horizontal may be selectively altered.

Figure 5:
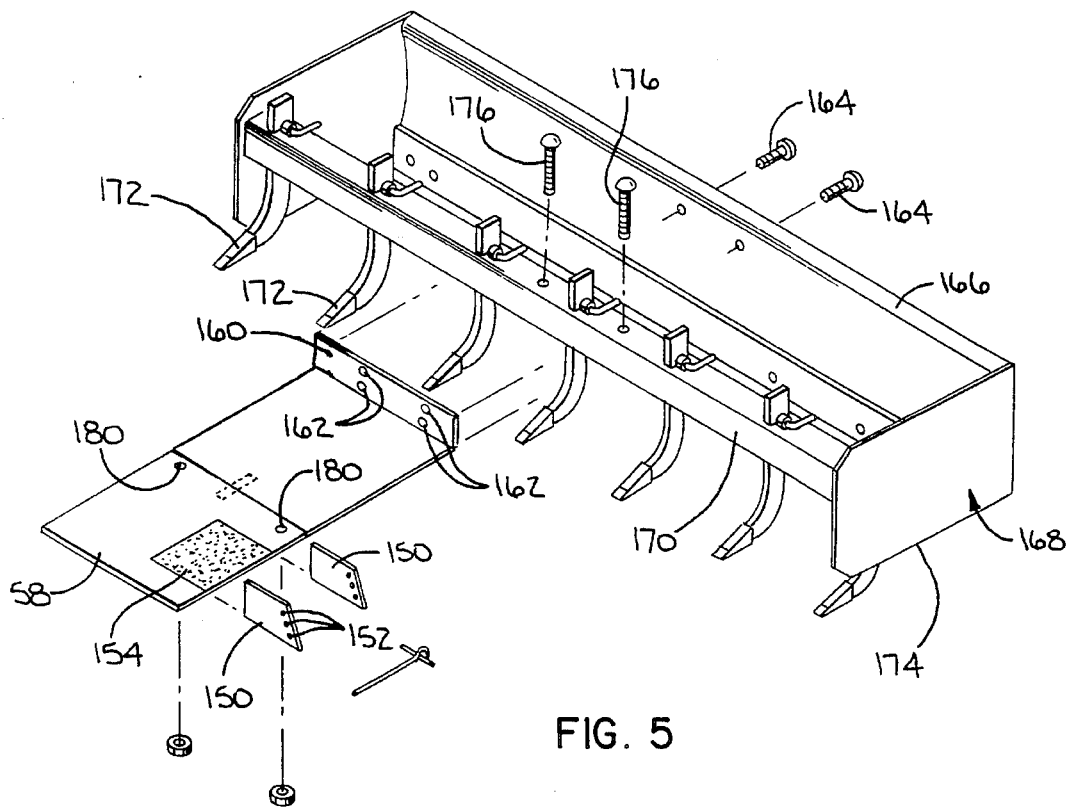
FIG. 5 is a partially exploded view of still another form of an attachment.

The invention is ideally suited for the employment of ground engaging tools other than a moldboard as well. FIG. 5 shows a box scrapper attachment that may be used if desired. In this embodiment, the shoe 58 may be provided with modified tongues 150 in lieu of the apertured tongues 98. The tongues 150 have three pivot pin receiving apertures 152 which provide a means of adjustment of the attitude of the box scrapper with respect to the horizontal simply by appropriately selecting which of the apertures 152 is to receive the appropriate pivot pin.

The shoe 58 may also have a cut-out area 154 between the tongues 150 to allow a greater range of movement by avoiding interference between the outrigger arm 48 (not shown in FIG. 5) and the surface of the shoe 58.

An upstanding plate 160 is welded to one side of the shoe 58 and includes apertures 162 for a receipt of fasteners 164 by which the shoe 58 may be fastened to the base wall 166 of a three walled box, generally designated 168. The open end of the box may be partially closed by a tube 170 of rectangular cross-section mounting depending chisel teeth 172 for breaking up the underlying terrain. The lower edge 174 of the box 168 thus serves as a scraper.

Additional threaded fasteners 176 may be disposed in the tube 170 to extend through apertures 180 in the shoe 58.

Figure 6:
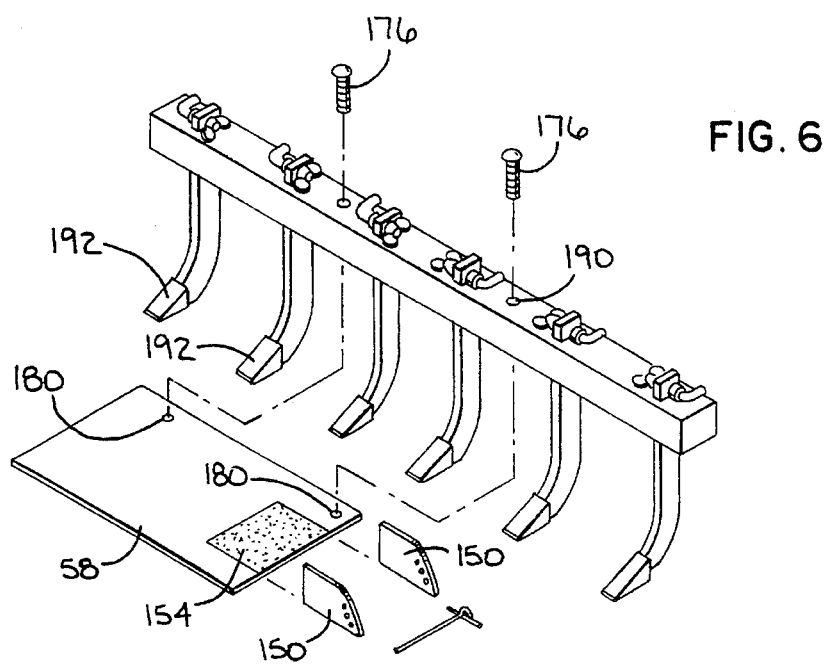
FIG. 6 is a partially exploded view of still another form of an attachment.

FIG. 6 illustrates a scarifier attachment that may be employed. A shoe 58 very similar or even identical to the shoe shown in FIG. 5 is employed. The scarifier includes a tube 189 of rectangular cross-section mounting chisel teeth 191. The tube 189 may be bolted to the shoe 58 using the apertures 180 and bolts 176 or, in the alternative, may be directly connected thereto as by welding.

Figure 7:
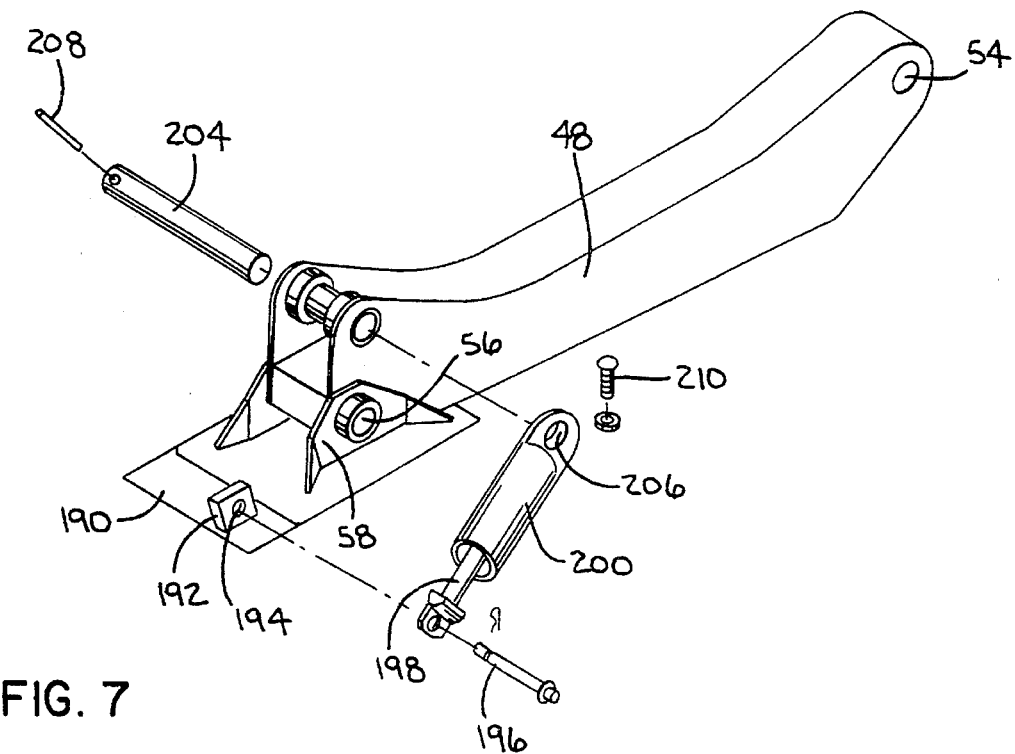
FIG. 7 is an exploded view of another embodiment of the invention.

FIG. 7 illustrates a convenient way of providing for powered adjustment of the ground engaging tool about a generally horizontal axis. According to this embodiment of the invention, the stabilizier shoe 58 may be provided with an extension 190 on its side extending away from the vehicle itself. The extension may be as simple as merely welding a plate to the underside of the shoe 58.

One or more apertured tongues 192 may be mounted on the extension 190 to extend upwardly therefrom and includes a pin receiving aperture 194. A pivot pin 196 is adapted to pivot the rod end 198 of a hydraulic cylinder 200 to the extension 190 by being extended through the aperture 194. Cotter keys or the like may be utilized to hold the pin 196 in place.

The pivot pin 66 (FIG. 2) by which the rod end 64 of the outrigger cylinder 62 is pivoted to the shoe 58 is replaced with an elongated pin 204. The length of the pin 204 is such that it may pivot the rod end 64 of the cylinder 62 to the stabilizer arm 48 and yet extend sufficiently to one side of the arm 48 as to be received in an aperture 206 in the cylinder end of the cylinder 200. Cotter keys 208 and a bolt 210 may be utilized to secure components together.

As a result of the foregoing, it will be appreciated that the hydraulic cylinder 200 may be operated to pivot the shoe 58 about the pivot 56, that is, about a horizontal axis generally parallel to the length of the vehicle frame. Thus, any ground engaging tool secured to the shoe 58 at its extension 190 as described previously may be pivoted about a horizontal axis to any desired attitude.

From the foregoing, it will be readily appreciated that the invention provides a means of obtaining grading or plowing, scraping, or scarifying functions, in addition to stabilizing functions, out of the outrigger stabilizers employed on a variety of vehicles. As such, it provides improved flexibility of use of such vehicles along with excelled hydraulic control of the functions with minimal additional expense.

We claim:

1. A backhoe comprising a vehicle frame having sides and front and rear ends;

means defining an operator location on said frame;

front and rear wheels on said frame;

a backhoe mounted on the rear end of said frame and operable from said operator location;

a pair of outrigger arms, one on each side of said frame near said rear end, and pivoted thereto for rotation about a generally horizontal axis;

hydraulic cylinders extending between said frame and said arms and operable to move said arms about said horizontal axis;

stabilizing shoes connected to each of said arms at their ends remote from said frame, and adapted to firmly engage the underlying terrain outboard of said rear wheels to provide support for said frame against tipping;

mounting means on at least one of said stabilizing shoes whereby a ground engaging tool may be coupled to said one shoe and thus the associated outrigger arm and be powered by the hydraulic cylinder connected to the associated outrigger arm; and a ground engaging tool having mounting means complementary to said mounting means on said at least one stabilizing shoe for mounting on said one stabilizing shoe.

2. The backhoe of claim 1 wherein said tool is a moldboard.

3. The backhoe of claim 1 wherein said mounting means includes a movable connection whereby the relation of the tool coupled to the stabilizing shoe to the shoe may be adjusted.

4. The backhoe of claim 3 wherein said movable connection includes a pivot and further including stop means for disabling the pivot in any of a variety of positions.

5. The backhoe of claim 4 wherein said shoe has a generally flat ground engaging surface of substantial area and said pivot includes a bushing on said shoe and having a shaft receiving opening generally transverse to said surface.

6. The backhoe of claim 5 wherein said complimentary mounting means includes a shaft receivable in said bushing, said shaft having a bracket mounted on one side thereof, and adjustable means securing said tool to said bracket whereby the attitude of the shaft with respect to the tool may be selectively changed.

7. The backhoe of claim 6 wherein said adjustable means comprise spaced, arcuate slots in said bracket and studs on said tool receivable in said slots, and means for locking said studs in a desired position within said slots.

8. The backhoe of claim 4 wherein said stop means comprises a series of apertures in one of said shoe and said tool and at least one aperture in the other of said shoe and said tool, said at least one aperture being selectively alignable with any one of the apertures in said series, and a pin sized to extend through aligned ones of said apertures.

9. A vehicle comprising:

a vehicle frame having sides and front and rear ends;

means defining an operator location on said frame;

front and rear wheels on said frame;

a power tool mounted on said frame between said rear wheels and operable from said operator location;

a pair of outrigger arms having opposed ends, one arm on each side of said frame near said rear end, and having one end pivoted thereto for rotation about a generally horizontal axis;

hydraulic cylinders extending between said frame and said arms and operable to move said arms about said horizontal axis; and a ground engaging tool means mounted on the other end of at least one of said arms for engaging the surrounding terrain, said tool means being selected from the group consisting of a moldboard, a box scraper and a scarifier.

10. The vehicle of claim 9 wherein said tool means is mounted on said other end of at least one of said arms via a ground engaging stabilizing shoe having a flat surface of substantial area.

11. The vehicle of claim 9 wherein said tool means is adjustably mounted on said other end of at least one of said arms.

12. The vehicle of claim 9 further including an adjustable connection between said tool means and said other end of at least one of said arms.

13. The vehicle of claim 12 further including a lock for said adjustable connection to lock said ground engaging tool means in a selected orientation with respect to said other end of at least one of said arms.

14. The vehicle of claim 13 wherein said lock is manually adjusted.

15. The vehicle of claim 9 further including a manually operable adjustable connection between said tool means and said other end of at least one of said arms.

* * * * *